(12) United States Patent
Mitsui

(10) Patent No.: US 9,160,888 B2
(45) Date of Patent: Oct. 13, 2015

(54) INFORMATION PROCESSING APPARATUS, USER INFORMATION MANAGEMENT CONTROL METHOD, AND STORAGE MEDIUM

(71) Applicant: CANON KABUSHIKI KAISHA, Tokyo (JP)

(72) Inventor: Akihiro Mitsui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/091,178

(22) Filed: Nov. 26, 2013

(65) Prior Publication Data

US 2014/0153018 A1 Jun. 5, 2014

(30) Foreign Application Priority Data

Nov. 30, 2012 (JP) .................................. 2012-263127

(51) Int. Cl.
*G06F 3/12* (2006.01)
*H04N 1/44* (2006.01)

(52) U.S. Cl.
CPC .................................. *H04N 1/4413* (2013.01)

(58) Field of Classification Search
CPC .................................................. H04N 1/4413
See application file for complete search history.

(56) References Cited

U.S. PATENT DOCUMENTS

2009/0033990 A1* 2/2009 Matsugashita ............... 358/1.15
2011/0216347 A1* 9/2011 Kikuchi ....................... 358/1.14

FOREIGN PATENT DOCUMENTS

JP 2010-218287 A 9/2010

* cited by examiner

*Primary Examiner* — Benny Q Tieu
*Assistant Examiner* — Michael Y Tzeng
(74) *Attorney, Agent, or Firm* — Canon U.S.A., Inc., IP Division

(57) ABSTRACT

An information processing apparatus manages user information in such a manner that the user information is unable to be acquired using an authority different from a user authority, and acquires the user information by changing an authority of a control unit configured to control print processing under a system authority from a system authority to the user authority of a user that issues an instruction for print processing.

15 Claims, 12 Drawing Sheets

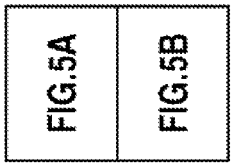
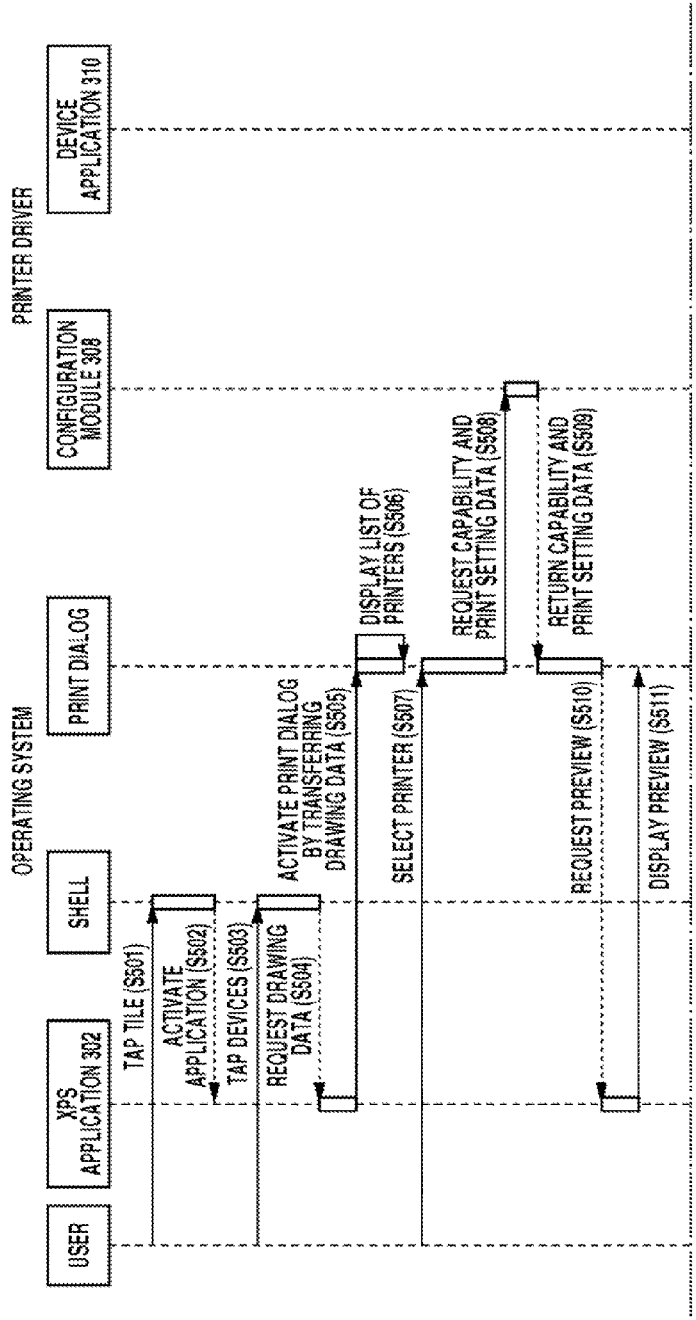

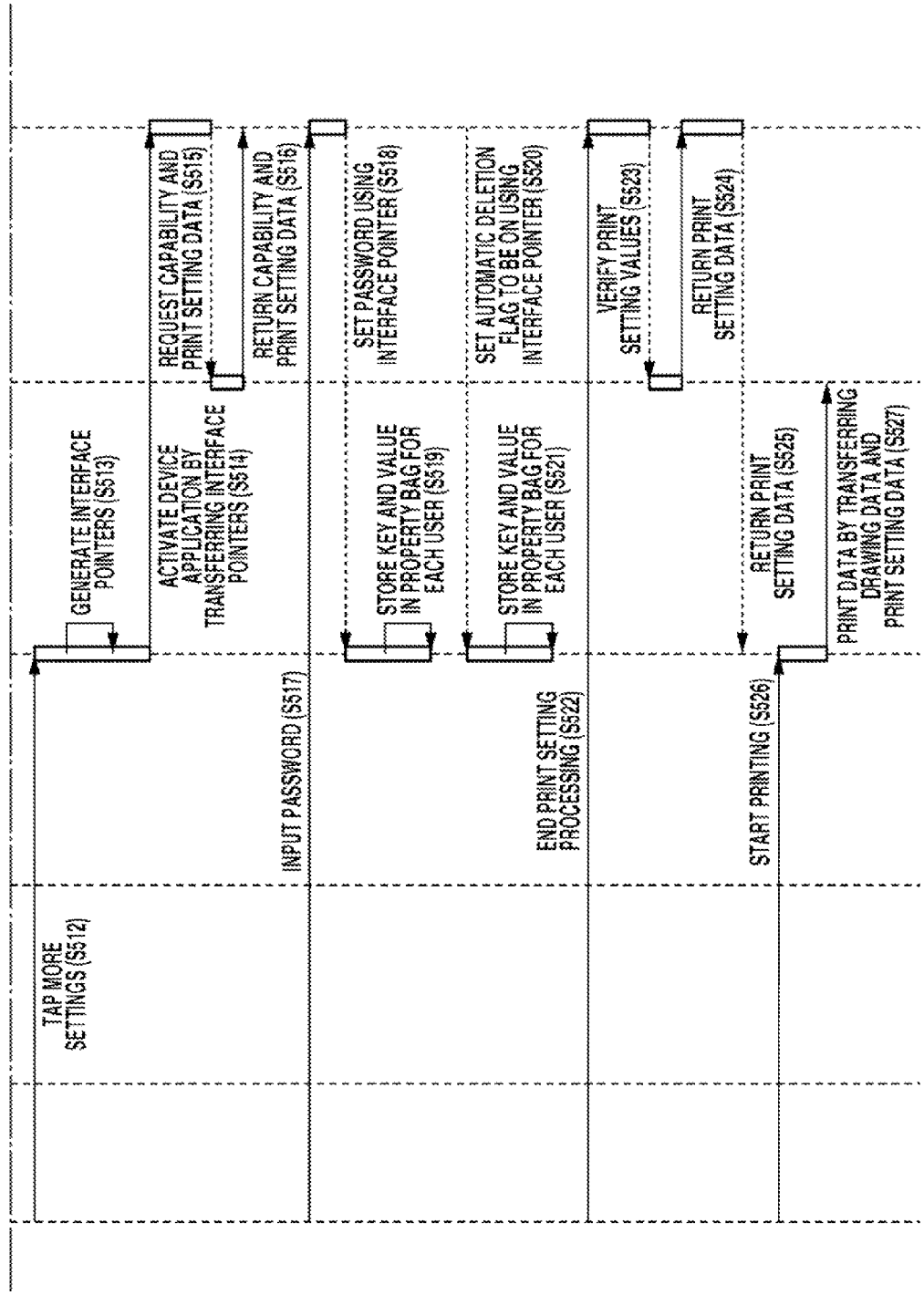

FIG.8

| KEY | VALUE |
|---|---|
| AutoDelete | True |
| SecuredPrintPassword | 1234567 |

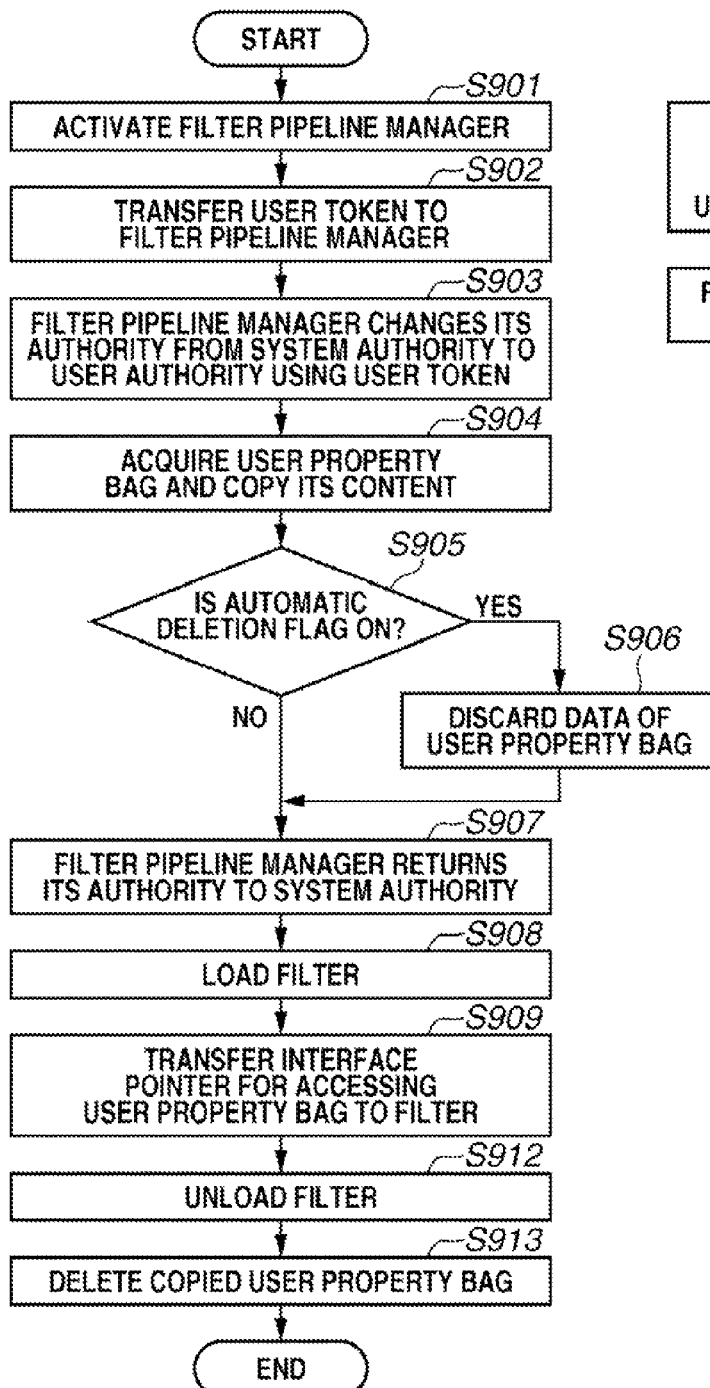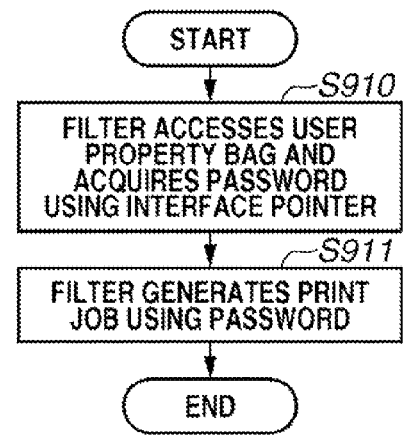

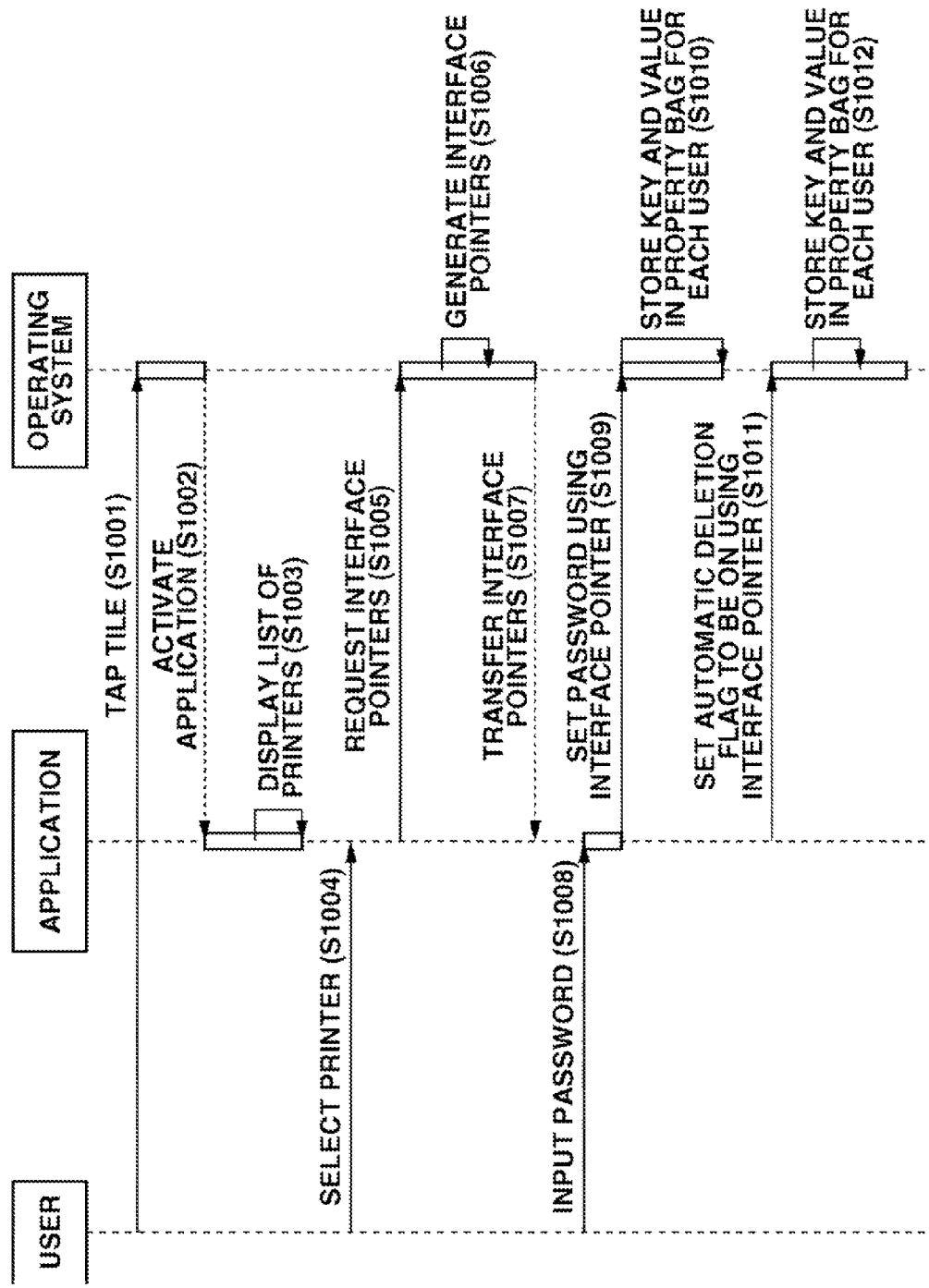

INFORMATION PROCESSING APPARATUS, USER INFORMATION MANAGEMENT CONTROL METHOD, AND STORAGE MEDIUM

BACKGROUND

1. Field

Aspects of the present invention generally relate to an information processing apparatus, a control method, and a storage medium.

2. Description of the Related Art

Printers have a secure printing function, according to which the printers store a received print job, and print the stored print job if a correct password is input with use of an operation panel of the printers. Then, printer drivers can transmit a print job containing user information, such as a password, to instruct the printer to carry out secure printing. Japanese Patent Application Laid-Open No. 2010-218287 discusses that print setting data containing a password is generated to realize secure printing.

However, if user information, such as a password, is stored as a part of the print setting data as discussed in Japanese Patent Application Laid-Open No. 2010-218287, confidentiality of the user information in the print setting data may decrease depending on an operation environment of the information processing apparatus.

SUMMARY

Aspects of the present invention are generally directed to preventing confidentiality of user information from decreasing.

According to an aspect of the present invention, an information processing apparatus, which is configured to generate a print job interpretable by an image processing apparatus, includes a management unit configured to manage user information in such a manner that the user information is unable to be acquired using an authority different from a user authority, a control unit configured to control a printer driver, and a setting unit configured to set an authority of the control unit to the user authority of a user that issues an instruction for print processing. The control unit acquires the managed user information using the set user authority. A print job generated based on the acquired user information is transmitted to the image processing apparatus.

Further features of the present disclosure will become apparent from the following description of exemplary embodiments with reference to the attached drawings.

BRIEF DESCRIPTION OF THE DRAWINGS

FIG. 5, which is composed of FIGS. 5A and 5B, illustrates a sequence for storing user information into a property bag.

FIG. 8 illustrates an example of information stored in the property bag.

FIGS. 9A and 9B are flowcharts illustrating print processing.

FIG. 10 illustrates a sequence for storing the user information into the property bag.

DESCRIPTION OF THE EMBODIMENTS

Various exemplary embodiments, features, and aspects will be described in detail below with reference to the drawings.

Figure 1:
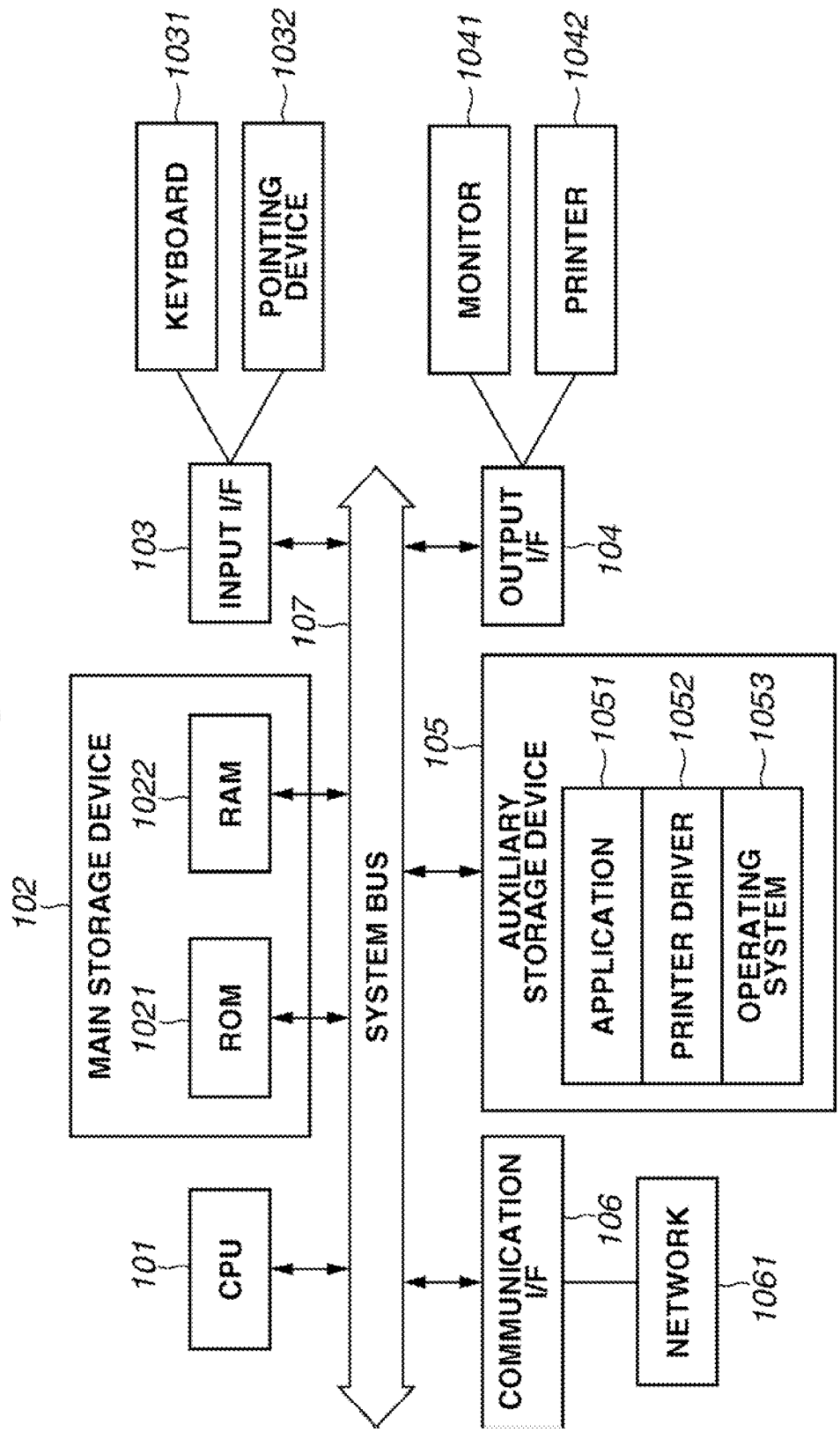
FIG. 1 is an example of a block diagram illustrating a configuration of hardware and software of a computer system.

FIG. 1 is a block diagram illustrating a configuration of a system using a commonly used information processing apparatus (a computer) according to a first exemplary embodiment. Unless otherwise specifically indicated, the present exemplary embodiment can be applied to any kind of configuration regardless of a single function, a system constituted by a plurality of apparatuses, or a system connected via a network to perform processing, as long as that configuration can realize functions according to the present exemplary embodiment.

A central processing unit (CPU) 101 controls the whole information processing apparatus according to a program stored in a read only memory (ROM) 1021 or a random access memory (RAM) 1022 of a main storage device 102, or an auxiliary storage device 105. The RAM 1022 is also used as a work area when the CPU 101 performs various kinds of processing. The auxiliary storage device 105 stores application software 1051, an operating system (OS) 1053, and a printer driver 1052. Input devices such as a keyboard 1031, and a pointing device 1032 represented by a mouse, a touch panel are devices that allow a user to issue various kinds of instructions to the computer via an input interface (I/F) 103. An output I/F 104 is an interface for externally outputting data, and outputs data to an output device such as a monitor 1041 and a printer 1042. The information processing apparatus may be connected to the printer 1042 via not only a local input/output (I/O), to which the information processing apparatus is directly connected, but also a network 1061, to which the information processing apparatus is connected via a communication I/F 106. Further, a common data system bus 107 enables an exchange of data between the I/Fs and modules. The CPU 101 reads out a program regarding a flowchart from the memories and executes it, by which respective steps in the flowchart according to the present exemplary embodiment are realized. Further, the printer 1042 may be a printing apparatus having only a printing function, may be a facsimile (FAX) apparatus having only a facsimile function, or may be a multifunction peripheral having a plurality of functions such as a scanning function and the printing function. The printer 1042 may be also referred to as an image processing apparatus.

Figure 2:
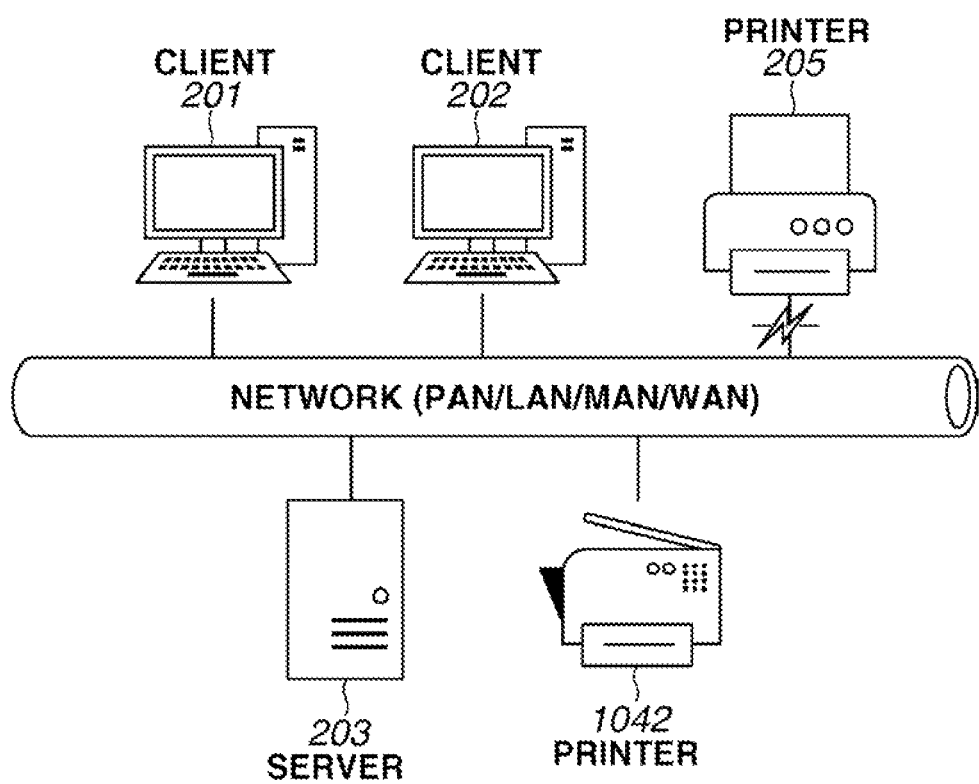
FIG. 2 illustrates an example of a configuration of a network to which a client, a server, and a printer are connected.

FIG. 2 schematically illustrates an environment of the network 1061 according to the present exemplary embodiment.

A single client computer or a plurality of client computers 201/202, which generates a document and an image to be printed, is connected to the network 1061. Further, a server computer 203, which manages a user of the client computer(s) 201/202 and printer(s) 205/1042, may be connected to the network 1061. A single printer or a plurality of printers 205/1042 is connected to the network 1061. FIG. 2 illustrates that the printer 205 is physically connected to the network 1061, but is in an off-line state so that the printer 205 cannot be used actually.

The network 1061 includes networks from a small-scale network to a large-scale network, such as a personal area network (PAN), a local area network (LAN), a metropolitan area network (MAN), and a wide area network (WAN), and the above-described apparatuses are connected to all of the networks. The server 203 and the printer(s) 205/1042 may be connected beyond the Internet such as a cloud configuration. In other words, the information processing apparatus is an apparatus connectable to another apparatus (for example, a printer).

Figure 3:
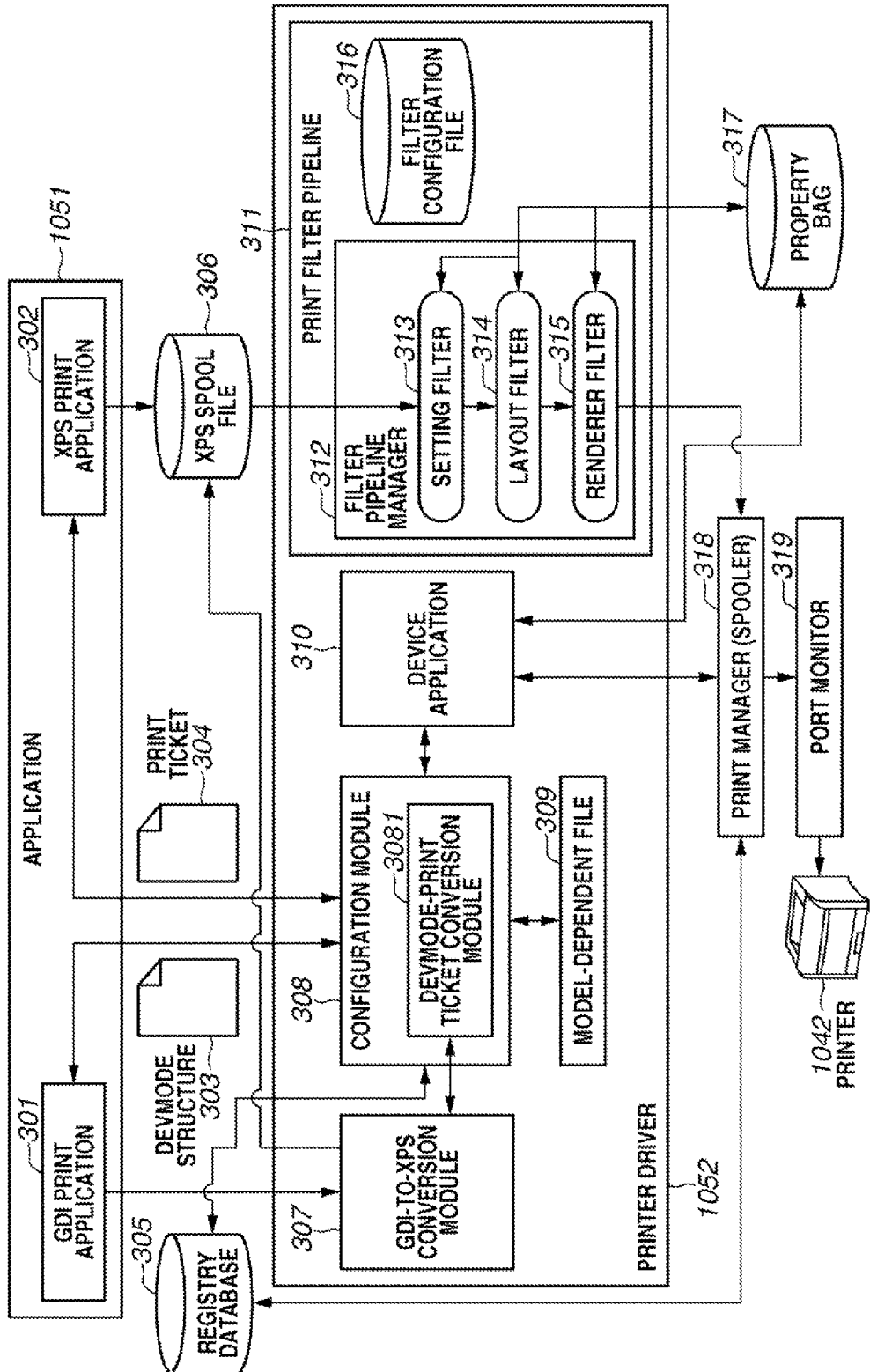
FIG. 3 is an example of a block diagram illustrating a configuration of a v4 driver print processing system.

FIG. 3 is a block diagram illustrating a configuration of a v4 driver print system. The v4 driver print system is a system that performs printing by using a file format called Extensible Markup Language (XML) Paper Specification (hereinafter abbreviated as an XPS) as spool data. The v4 driver print system operates on the operating system 1053.

A print manager 318, a Graphics Device Interface (GDI)-to-XPS conversion module 307, and a filter pipeline manager 312 are modules included in the operating system 1053. The GDI-to-XPS conversion module 307 and the filter pipeline manager 312 are included in the printer driver 1052, and are modules dedicated to the printer driver 1052 provided by the operating system 1053.

The printer driver 1052, respective filters 313 to 315 of the filter pipeline manager 312, and a device application 310 are stored in the auxiliary storage device 105 illustrated in FIG. 1 as the printer driver 1052. A GDI print application 301 (hereinafter abbreviated as a GDI application) and an XPS print application 302 (hereinafter abbreviated as an XPS application) are stored in the auxiliary storage device 105 illustrated in FIG. 1 as an application 1051. The GDI application 301 is an application that performs printing using Graphics Device Interface (GDI) prepared by the operating system 1053. The XPS application 302 is an application that performs printing directly using an XPS spool file 306. A user issues an instruction for print processing from the GDI application 301 or the XPS application 302 displayed on the monitor 1041 of the output device with use of the input device such as the keyboard 1031 and the pointing device 1032. The print processing is realized by sequentially performing three kinds of processing, "a selection of a printer", "generation of print setting data", and "conversion of drawing data". In the following description, a flow of the print processing will be described.

First, the user selects the printer 1042 by which the user wants to print data. From user's point of view, the selection of the printer 1042 is the same as a selection of the printer driver 1052 corresponding to the printer 1042 that will perform printing.

Next, print setting data is generated. When the print setting data is generated, the application 1051 acquires a memory area for the print setting data in the RAM 1022. Then, the application 1051 calls a configuration module 308 of the printer driver 1052, generates the print setting data, and stores the generated print setting data. The GDI application 301 uses a binary DEVMODE structure 303 as the print setting data, and the XPS application 302 uses a print ticket 304 written in XML, which is a markup language. The DEVMODE structure 303 has a standard area defined by the operating system 1053, and an extended area uniquely defined by the printer driver 1052. The print ticket 304 is print setting data written in the XML format, and a standard area and an extended area thereof are written separately by namespaces. Because the print setting data also contains information unique to a machine model, the configuration module 308 generates the print setting data with use of a model-dependent file 309. The application 1051 overwrites a content of the DEVMODE structure 303 or the print ticket 304, thereby changing a content of the print setting data. The specification of the standard area of the print setting data is externally disclosed, whereby the application 1051 can directly change the content of the standard area. Regarding the extended area dependent on the printer 1042, only the printer driver 1052 grasps the detailed specification thereof, whereby the user sets it with use of a user interface owned by the device application 310.

The device application 310 is a kind of the printer driver 1052, but is installed as a separate program from the printer driver 1052. The device application 310 is installed in conjunction with installation of the printer driver 1052. The printer driver 1052 changes settings dependent on the printer 1042 in the DEVMODE structure 303 or the printer ticket 304 according to the setting of the user interface. The print setting data contains setting values required for printing such as information about a sheet size to be output (for example, "A4"), a selection of two-sided printing, a selection of color printing or monochrome printing, and a selection of a sheet feed stage. In the print ticket 304, the setting values are written in the XML format, whereby the XPS application 302 can directly change and overwrite all of the setting values. However, the extended area is uniquely defined so that the detailed specification thereof is unknown, and this specification varies depending on the printer 1042. Therefore, it is easier to change the setting values with use of the user interface of the device application 310. The print setting data is required each time a document is printed, and therefore is generated in each case. An optional device of the printer 1042 and an environmental setting for each user are stored by the printer driver 1052 into a registry database 305 of the operating system 1053. User information that should refrain from using the print setting data and the registry database 305 (for example, a password for secure printing and a telephone number used for FAX transmission) is stored in a property bag 317. Default values of the print setting data are stored by the print manager 318 of the operating system 1053 into the registry database 305. The registry database 305 and the property bag 317 are stored in the auxiliary storage device 105.

Lastly, drawing data is converted. After the print setting data is determined, the user issues an instruction for printing processing from the application 1051. When printing is performed from the GDI application 301, the drawing data is transmitted to the GDI-to-XPS conversion module 307 that is realized as the printer driver 1052, and the XPS spool file 306 is generated. At this time, the GDI-to-XPS conversion module 307 calls up the configuration module 308, and converts the print setting data from the DEVMODE structure 303 into the print ticket 304. A DEVMODE-print ticket conversion module 3081 is used for this conversion. When printing is performed from the XPS application 302, there are two methods. The first method is that the XPS application 302 itself generates the XPS spool file 306. The second method is that the operating system 1053 generates the XPS spool file 306 according to a drawing instruction from the XPS application 302. In either method, the XPS spool file 306 is generated during printing. In this manner, the v4 driver print system is characterized in that the XPS spool file 306 is always generated based on drawing data at the time of printing. After the XPS spool file 306 is generated, the processing is transferred to a print filter pipeline 311. The print filter pipeline 311 is such a mechanism that printing is performed via a plurality of filters. A filter configuration file 316 controls the number and order of filters. The filter pipeline manager 312 that operates in the print filter pipeline 311 performs the processing according to the filter configuration file 316. In the present exemplary embodiment, the filter pipeline manager 312 performs the processing in the order of a setting filter 313, a layout filter 314, and a renderer filter 315. The number and types of the filters vary depending on the configuration of the printer driver 1052. For example, a copy-forgery-inhibited pattern filter for adding a copy-forgery-inhibited pattern image and a transmission filter for transmitting drawing data to the server 203 may be included, in addition to the three filters illustrated in FIG. 3.

The printing processing is implemented by transferring the XPS spool file 306 to the filters 313, 314, and 315. The filters 313, 314, and 315 respectively process the XPS spool file 306 and transfer the processed file to the next filter, thereby advancing the processing. Lastly, the XPS spool file 306 is converted into a print job, and is output to the printer 1042. The printer 1042 can interpret the print job, and perform the printing processing based on the print job by interpreting this print job. If the printer 1042 has an XPS direct print function that allows the printer 1042 to read and print the XPS spool file 306, the XPS application 302 may directly transmit the XPS spool file 306 to the printer 1042 to print the data while skipping all of the filters 313, 314, and 315. Further, the filters 313, 314, and 315 can store their unique data into the property bag 317. Further, the filters 313, 314, and 315 can even acquire information of the operating system 1053 and data of another filter from the property bag 317. The setting filter 313 reads the print ticket 304 and writes data necessary for printing into the print ticket 304. The layout filter 314 performs processing relating to a layout, such as scaling, an imposition layout in bookbinding, and stamping. The layout filter 314 operates according to the print ticket 304 contained in the XPS spool file 306. Therefore, for example, if a setting of imposition is not contained in the print ticket 304, the layout filter 314 passes the XPS spool file 306 without performing any operation, and directly transmits the XPS spool file 306 to the next filter. Lastly, the renderer filter 315 renders the XPS spool file 306 to convert it into data written in a page description language (hereinafter abbreviated as a PDL). Further, the renderer filter 315 converts the print setting data in the print ticket 304 into data written in a print job language (hereinafter abbreviated as a PJL). The renderer filter 315 collectively transfers the PDL data and the PJL data to the filter pipeline manager 312 as a print job. The print job is transmitted to the print manager 318, which manages a schedule of the print processing, and is registered into a queue (a waiting line) one after another. The print manager 318 transmits the print job via a port monitor 319 in the order that the print jobs are registered in the queue, once the printer 1042 becomes ready for printing. In this manner, a main role of the printer driver 1052 is conversion of the drawing data and the print setting data into the print job, allowing the information processing apparatus to perform printing.

The present exemplary embodiment is described using the print processing so that the description is focused on the printer driver. However, the present embodiment is not just applicable to print processing, and can be also applied to other processing, such as FAX transmission processing. In the case of FAX transmission processing, a FAX driver operates, instead of the printer driver. The printer driver and the FAX driver may be collectively referred to as a device driver.

Figure 4:
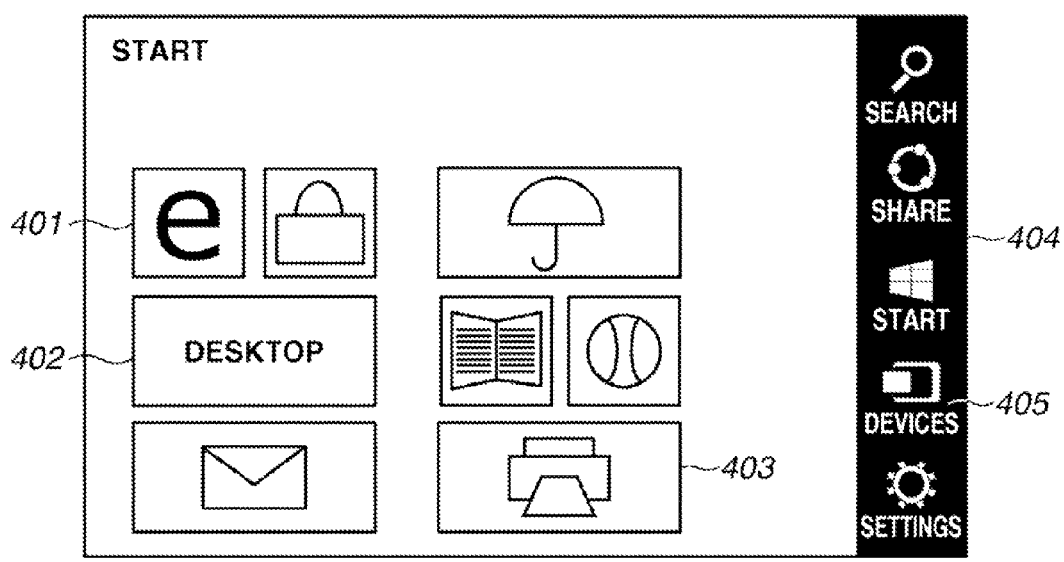
FIG. 4 illustrates an example of a start menu of an operating system.

An example of an issue based on which the present embodiment has been contrived will be described below. A setting screen of the v4 printer driver 1052 is separated as a device application (the device application 310, which will be described below). Therefore, the v4 printer driver 1052 and the application 1051 exchange information with use of the print ticket 304. However, the print ticket 304 may be also stored in a document file handled by the application 1051, whereby user information may leak to a third party via the document file. After the user starts up a computer and logs in a system, a shell for displaying a user interface of the operating system 1053 is activated, displaying a start screen illustrated in FIG. 4. The shell is a module of the operating system 1053 that operates to display the start screen, a system menu, and the like. Tiles 401 for activating the applications 1051 are arranged in the start screen. When the user taps or clicks the tile 401, the operating system 1053 activates the application 1051. Most of the activated applications 1051 are applications optimized to the touch panel where the applications 1051 are displayed in full-screen, and correspond to the XPS application 302. The GDI application 301 is activated from a desktop screen, which is displayed by tapping or clicking a desktop tile 402. The GDI application 301 can be also registered with the start screen as the tile 401. The device application 310 is registered as a tile 403. Therefore, when the user taps or clicks the tile 403, the device application 310 is activated.

The operating system 1053 has a system menu 404. The system menu 404 provides common functions to the applications 1051. For example, when the user taps a DEVICES 405, the user can issue a print instruction from the applications 1051.

Next, a process for generating a print job with user information added thereto according to the present exemplary embodiment will be described with reference to FIG. 5, which is a sequence diagram, and FIG. 8, which illustrates an example of information.

FIG. 5 is a sequence diagram illustrating a flow until a user starts printing with use of the application 1051.

First, in step S501, the user taps the tile 401 of the application 1051 displayed on the start screen. If the tile 401 is tapped, in step S502, the shell of the operating system 1053 activates the application 1051 corresponding to the tapped tile 401. The application 1051 activated in step S502 is the XPS application 302.

In step S503, the user opens the system menu 404 to tap the DEVICES 405 while displaying a document that the user wants to print by the XPS application 302 on the screen. In response to the operation in step S503, in step S504, the shell of the operating system 1053 requests drawing data to the XPS application 302. In step S505, the XPS application 302 transfers the drawing data to the operating system 1053, thereby activating a print dialog of the operating system 1053. In step S506, the print dialog displays a list of printable printers registered with the operating system 1053. The print dialog is a module of the operating system 1053 that displays information regarding printers.

In step S507, the user taps an icon of a printer to be used for printing among the listed printers to select it. In step S508, the print dialog requests a capability of the printer selected in step S507 and default print setting data to the configuration module 308 of the printer driver 1052.

In step S509, the configuration module 308 of the printer driver 1052 returns the capability of the printer and the default print setting data to the print dialog. The default print setting data acquired by the print dialog in step S509 is the print ticket 304.

In step S510, the print dialog transfers the print ticket 304, which is print setting data, to the XPS application 302, and requests the XPS application 302 to generate a preview image of the drawing data. In step S511, the XPS application 302 reads the transferred print ticket 304 to interpret the setting values, generates a preview image according to the setting values, and returns the generated preview image to the print dialog.

Figure 6:
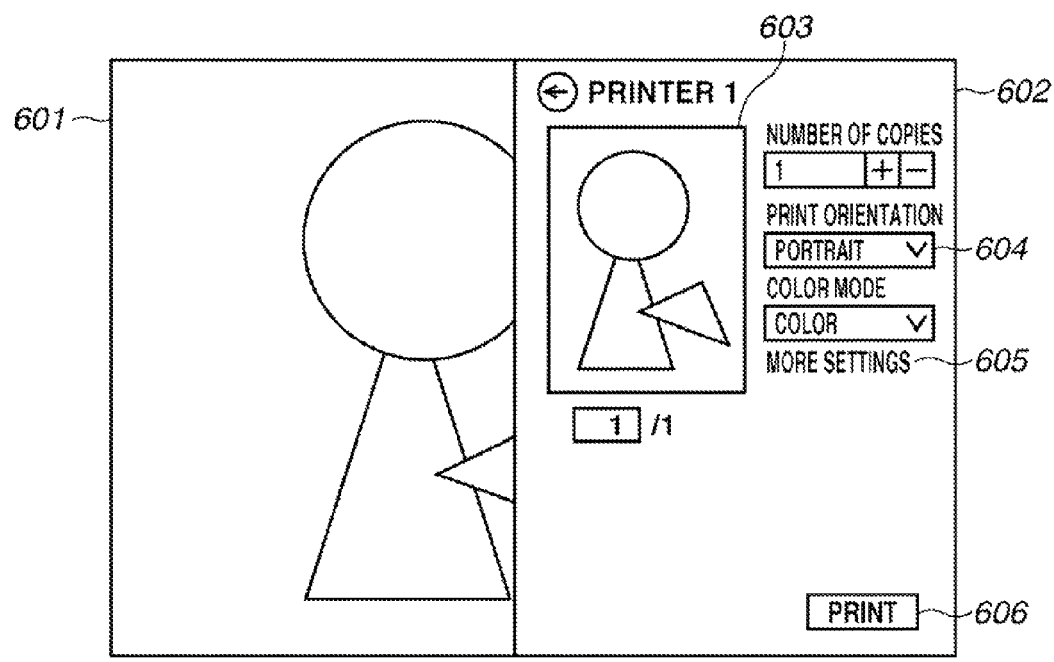
FIG. 6 illustrates an example of a screen of a print dialog.

FIG. 6 illustrates a screen displayed by step S511. The document to be printed by the XPS application 302 is displayed in a portion 601. A print dialog screen 602 is displayed on the right side of the screen of the XPS application 302. The print dialog screen 602 displays the preview image 603 of the drawing data of the document transferred from the XPS application 302.

The print dialog screen 602 displays a control 604 so as to allow the user to change the print setting value according to the printer capability transferred from the configuration module 308. The control 604 includes a print setting item and options. For example, the user selects an arrow of the control 604, by which PORTRAIT and LANDSCAPE are displayed as options of print orientation.

The print dialog screen 602 displays the control 604 regarding a setting item in the standard area in the print setting data. In step S512, the user taps MORE SETTINGS 605 to select it. Then, in step S513, the print dialog generates interface pointers for accessing the property bags 317. The property bags 317 can manage various kinds of data. The property bags 317 include a driver property bag, a queue property bag, and a user property bag. These property bags 317 may be simply referred to as storage areas, because they store and manage data. The operating system 1053 generates, for example, three types of interface pointers to allow the application 1051 to access data contained in the three property bags 317.

The driver property bag manages a part of data in the model-dependent file 309 owned by the printer driver 1052. The queue property bag manages a part of data stored by the printer driver 1052 into the registry database 305, such as an optional device and an environment setting for each user. The user property bag manages information of each user. As the user property bag, a different area is prepared for each user, whereby a user cannot access other user property bags. Therefore, user information such as personal information is managed in the user property bag.

In step S514, the print dialog activates the device application 310 of the printer driver 1052 by transferring these interface pointers.

In step S515, the device application 310 requests the capability of the printer and the print setting data to the configuration module 308. In step S516, the configuration module 308 returns the capability of the printer and the print setting data to the device application 310.

Figure 7:
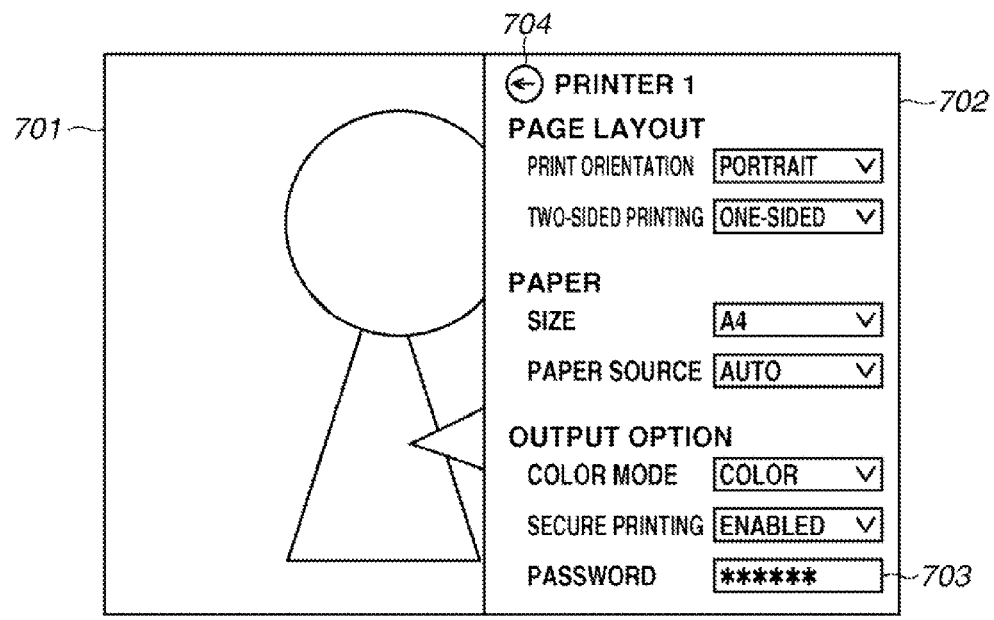
FIG. 7 illustrates an example of a screen of a device application.

FIG. 7 illustrates a screen displayed by step S516.

The document to be printed by the XPS application 302 is displayed in a portion 701 at the same position as the position illustrated in FIG. 6 without any change made thereto. A user interface 702 of the device application 310 is displayed at a position where the print dialog screen 602 used to be displayed. The device application 310 is different from the print dialog and is a part of the printer driver 1052, and therefore can access even the extended area of the print setting data.

Therefore, the device application 310 displays controls that allow the user to change print setting values in the standard area and the extended area according to the capability of the printer. For example, if the selected printer supports secure printing, a control regarding secure printing is displayed in the user interface 702. In step S517, the user inputs a password for secure printing into a control 703. In step S518, the device application 310 notifies the print dialog of the password for secure printing with use of the interface pointer for accessing the user property bag.

In step S519, the print dialog stores a key and a value reported from the device application 310 into the user property bag. The property bag 317 manages a combination of a key and a value as illustrated in FIG. 8. Information regarding secure printing, i.e., the password for secure printing is managed in the user property bag by setting a character string "SecuredPrintingPassword" to the key, and setting the input password to the value. The user property bag can manage user information such as an identification (ID) for department management, a security code, and a username in addition to the password for secure printing. Further, the user property bag can also manage flag data like "DON'T SHOW THIS MESSAGE AGAIN", in addition to the user information. In other words, the property bag can store any value as long as a set key and an acquired key match each other.

In step S520, the device application 310 notifies the print dialog that an automatic deletion flag is on with use of the interface pointer for accessing the user property bag. Step S520 may be realized by the device application 310 automatically notifying the print dialog that the automatic deletion flag is on, or may be realized by the user's instructing the device application 310 to set the automatic deletion flag to be on or off in advance. The device application 310 notifies the print dialog of "AutoDelete" as the key and "True" as the value with use of the interface pointer.

In step S521, the print dialog stores the key and value reported from the device application 310 into the user property bag.

In step S522, the user presses a return button 704 to notify the device application 310 that print setting processing is completed, when the user completes the print setting processing with use of the user interface 702 of the device application 310. In step S523, the device application 310 reflects the print setting values input by the user in the print ticket 304, and requests the configuration module 308 to verify the print setting values in the print ticket 304. The verification of the print setting values means confirmation whether the respective setting values of the print setting items are not prohibited, and the configuration module 308 generates the print ticket 304 in which prohibited values are corrected. In step S524, the configuration module 308 returns the print ticket 304 in which prohibited values are corrected to the device application 310 as the print setting data. In step S525, the device application 310 returns the eventually generated print setting data to the print dialog.

In step S526, the user taps a print button 606 on the print dialog screen 602, thereby instructing the print dialog to start printing. In step S527, the print dialog transfers the drawing data and the print setting data to the printer driver 1052 via the filter pipeline manger 312. The processing of step S527 will be described in detail now. The print dialog transfers the drawing data and the print setting data to the filter pipeline manager 312. Then, the filter pipeline manager 312 transfers the drawing data and the print setting data to the first filter (the setting filter 313 in FIG. 3) of the printer driver 1052, thereby starting generation of a print job by the printer driver 1052. A series of processing that the filter of the printer driver 1052 performs to acquire the user information stored in the user property bag will be described below with reference to FIGS. 9A and 9B.

After the user information is stored in the user property bag by the processing illustrated in FIG. 5, printing starts.

Next, processing performed upon a start of the printing processing will be described with reference to flowcharts illustrated in FIGS. 9A and 9B. The processing illustrated in FIGS. 9A and 9B starts when the print button 606 is tapped on the screen illustrated in FIG. 6. FIG. 9A illustrates processing by the operating system 1053, and FIG. 9B illustrates processing by the printer driver 1052.

After the print button 606 is tapped on the screen illustrated in FIG. 6, in step S901, the operating system 1053 activates the filter pipeline manager 312 under a system authority. The filter pipeline manager 312 has to accept a print request from all users logged in the operating system 1053, and therefore is activated under the system authority.

In step S902, the operating system 1053 acquires a user token of the application 1051 that received the print instruction, and transfers the acquired user token to the filter pipeline manager 312. The user token is handle information for identifying each user, and varies for each user registered with the operating system 1053. In step S903, the filter pipeline manager 312, which is operating under the system authority, temporarily changes its authority from the system authority to a user authority of the application 1051 with use of the user token. The filter pipeline manager 312 is allowed to change the authority, because the filter pipeline manager 312 is operating under the system authority.

In step S904, because the authority of the filter pipeline manager 312 is changed to the user authority of the application 1051 that received the print instruction, the filter pipeline manager 312 acquires the user property bag accessible using the changed user authority via the operating system 1053. The filter pipeline manager 312 copies the acquired user property bag into a memory for the filter pipeline manager 312. The key and value as illustrated in FIG. 8 are contained in the user property bag copied in step S904.

The filter pipeline manager 312 searches for an "AutoDelete" key in the user property bag acquired in step S904, and acquires the automatic deletion flag. In step S905, the filter pipeline manager 312 determines whether the automatic deletion flag is on, i.e., the automatic deletion flag is set to True. If the automatic deletion flag is on (YES in step S905), in step S906, the filter pipeline manager 312 discards the content of the user property bag. The data in the acquired user property bag is immediately discarded by the processing of step S906, by which the user information is held in the user property bag only for a brief time from the user's input of the user information such as the password to immediately after the start of the printing. As a result, the security can be improved.

When the processing of step S906 is completed (or if the filter pipeline manager 312 determines NO in step S905 (NO in step S905)), in step S907, the filter pipeline manager 312 returns its authority to the system authority. The filter pipeline manager 312 operates under the user authority for only a short time, and, therefore, acquiring other user information from the user property bag can be prevented, thereby improving the security.

Next, in step S908, the filter pipeline manager 312 loads the filter of the printer driver 1052. In step S909, the filter pipeline manager 312 transfers the interface pointers for accessing the user property bag copied in step S904 to the filter. In step S909, the filter pipeline manager 312 transfers the interface pointer for accessing the drawing data and also transfers the interface pointer for accessing the print setting data to the filter.

Referring to FIG. 9B, in step S910, the filter accesses the user property bag that the filter pipeline manager 312 copied in step S904 with use of the interface pointer transferred in step S909. Then, the filter acquires the user information (for example, the password) required for secure printing. The filter may first acquire the print setting data with use of the interface pointer transferred in step S909, and perform the processing of step S910 if the print setting data contains a setting value requiring the user information.

The filter acquires the drawing data and the print setting data with use of the respective interface pointers. Then, in step S911, the filter generates PJL data with use of the acquired password and print setting data, and generates PDL data from the drawing data, thereby generating a print job.

Then, the filter transmits the generated print job to the printer 1042 via the print manager 318 and the port monitor 319.

Referring back to FIG. 9A, in step S912, the filter pipeline manager 312 unloads the filter after the print job is output from the filter. Then, in step S913, the filter pipeline manager 312 deletes the user property bag copied in step S904.

By the processing illustrated in FIGS. 9A and 9b, the v4 printer driver 1052 can acquire the user information from the user property bag, generate the print job based on the user information, and transmit the generated print job to the printer 1042. The v4 printer driver 1052 receives XPS data as the drawing data and the print ticket 304 as the print setting data, and generates a print job. Further, the v4 printer driver 1052 can operate even on a platform specific to the OS 1053 (an environment suitable to the touch panel), and can generate a print job that reflects the setting values input to the user interface of the device application 310, which will be described below.

In this manner, even if the v4 driver print system has enhanced security and robustness, it is possible to generate a print job based on user information input by a user without reducing the security. Further, even in the operation required for the generation of a print job, the operating system 1053 automatically deletes the user information managed in the user property bag, whereby it is possible to realize this operation while further improving the security.

The automatic deletion flag can be set to be off. In this case, once user information is input, this information can be used repeatedly, which can save user's time and work taken to input the user information each time the user wants to print data, thereby improving the usability.

The filter pipeline manager 312 may perform the processing illustrated in FIGS. 9A and 9B, if the filter pipeline manager 312 interprets previous print setting data, and determines that the filter should be notified of the user information stored in the user property bag.

The first exemplary embodiment has been described based on the processing for realizing secure printing by using the user interface of the device application 310 called up from the print dialog screen 602. However, the user information can be also stored in the user property bag based on user's directly activating the device application 310 from the tile 403 without use of the print dialog screen 602. Processing according to the second exemplary embodiment will be described with reference to the sequence diagram illustrated in FIG. 10.

In step S1001, a user taps the tile 403 of the device application 310 displayed in the start screen. Next, in step S1002, the operating system 1053 activates the device application 310. In step S1003, the device application 310 displays a list of printers managed by the device application 310. In step S1004, the user selects a desired printer from the printers displayed by the device application 310.

In step S1005, the device application 310 requests interface pointers for accessing the property bags 317 to the operating system 1053. In step S1006, the operating system 1053 generates interface pointers for accessing the property bags 317. In step S1007, the operating system 1053 transfers the generated interface pointers to the device application 310.

Figure 11:
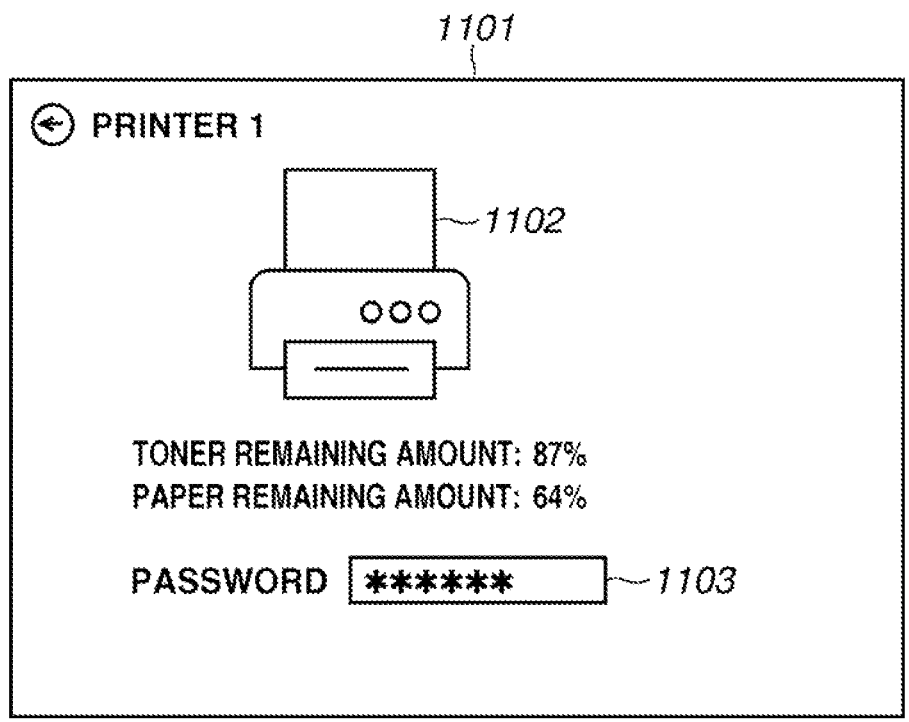
FIG. 11 illustrates an example of the screen of the device application.

The operating system 1053 transfers the interface pointers for accessing the three types of property bags 317 in a similar manner to the first exemplary embodiment. When the user selects the printer 1042, a screen provided by the device application 310, which is illustrated in FIG. 11, is displayed.

When the device application 310 is activated based on a tap on the start screen, the device application 310 is displayed in full-screen, like a screen 1101, in a different manner from the screen 702 displayed when the device application 310 is activated from the print dialog screen 602. Since the user has selected the printer 1042, an icon 1102 of the selected printer 1042 is displayed at the center of the screen 1101, and a control 1103 for inputting a password is provided on the screen 1101.

In step S1008, the user inputs a password into the control 1103 of the device application 310. In step S1009, the device application 310 notifies the operating system 1053 of a key indicating secure printing and the password (value) input in step S1008 with use of the interface pointer for accessing the user property bag.

In step S1010, the operating system 1053 stores the key and password (value) reported from the device application 310 into the user property bag. The property bag into which the key and password (the value) are stored in step S1010 is the property bag accessible with use of the interface pointer transferred in step S1007.

Next, in step S1011, the device application 310 notifies the operating system 1053 of the key and value indicating that the automatic deletion flag is on with use of the interface pointer for accessing the user property bag. In step S1012, the operating system 1053 stores the key and value reported from the device application 310 into the user property bag. In this manner, even when the device application 310 is activated from a tap on the start screen, it is possible to store the user information to be transferred to the printer driver 1052 into the user property bag.

When the user interface 702 of the device application 310 is displayed after completion of the processing of the sequence illustrated in FIG. 10, the password stored in step S1010 is displayed in the control 703 of the password for secure printing. An example thereof will be described now. For example, after completion of the processing of the sequence illustrated in FIG. 10, the user taps MORE SETTINGS 605 on the print dialog screen 602 illustrated in FIG. 6. This operation triggers the operating system 1053 to notify the device application 310 of the interface pointer for accessing the user property bag as described in the description of step S514 illustrated in FIG. 5. Then, the device application 310 can access the user property bag in which the password was stored in step S1010 with use of the reported interface pointer to acquire the password. The device application 310 displays this acquired password, by which the above-described processing is realized. According to the second exemplary embodiment, even if a user forgets to set user information such as a password at MORE SETTINGS 605 from the device application 310 at the time of printing, it is possible to use a previously input password.

The above exemplary embodiments have been described based on secure printing by way of example, but the processing according to these embodiments can be also applied to an operation requiring user information such as department management printing and FAX transmission, instead of secure printing.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the exemplary embodiments, it is possible to prevent confidentiality of user information from decreasing.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-263127 filed Nov. 30, 2012, which is hereby incorporated by reference herein in its entirety.

What is claimed is:

1. An information processing apparatus comprising:
a control unit configured to control a printer driver;
a first storage unit configured to store a print setting input on a print screen;
a second storage unit configured to store user information input on the print screen,
wherein the user information is obtained from the second storage unit using a user authority of a user, and is unobtainable from the second storage unit using an authority of another user;
a receiving unit configured to receive a print instruction; and
a setting unit configured to set an authority of the control unit to the user authority of a user that issues the print instruction after the print instruction,
wherein the control unit acquires and manages the user information from the second storage unit using the set user authority, and
wherein a print job generated based on the acquired user information and the print setting stored by the first storage unit are transmitted to an image processing apparatus, and
wherein the control unit notifies a filter of the printer driver activated to generate the print job of information for accessing the user information managed by the control unit.

2. The information processing apparatus according to claim 1, wherein the setting unit returns the authority of the control unit from the user authority to a system authority after the control unit acquires the user information.

3. The information processing apparatus according to claim 1, wherein the control unit deletes the user information of the user authority after the control unit acquires the user information.

4. The information processing apparatus according to claim 1, wherein the user information and print setting data are set via a screen of a device application installed in conjunction with the printer driver, and
wherein the printer driver is notified of the print setting data.

5. The information processing apparatus according to claim 1, wherein the user information is a password used for secure printing or a telephone number used in FAX transmission.

6. A control method comprising:
controlling a printer driver;
storing a print setting input on a print screen;
storing user information input on the print screen, wherein the user information is obtained using a user authority of a user, and is unobtainable using an authority of another user;
receiving a print instruction;
setting an authority of the controlling to the user authority of a user that issues the print instruction after the print instruction;
acquiring and managing the user information using the set user authority; and
transmitting a print job generated based on the acquired user information and the stored print setting to an image processing apparatus; and
notifying a filter of the printer driver activated to generate the print job of information for accessing the managed user information.

7. The control method according to claim 6, further comprising returning the authority of the controlling from the user authority to a system authority after the user information is acquired.

8. The control method according to claim 6, further comprising deleting the user information of the user authority after the managed user information is acquired.

9. The control method according to claim 6, wherein the user information and print setting data are set via a screen of a device application installed in conjunction with the printer driver, and
wherein the printer driver is notified of the print setting data.

10. The control method according to claim 6, wherein the user information is a password used for secure printing or a telephone number used in FAX transmission.

11. A non-transitory storage medium storing computer executable instructions executable by an information processing apparatus, the computer executable instructions comprising:
controlling a printer driver;
storing a print setting input on a print screen;
storing user information input on the print screen, wherein the user information is obtained using a user authority of a user, and is unobtainable using an authority of another user;
receiving a print instruction;
setting an authority of the controlling to the user authority of a user that issues the print instruction after the print instruction;
acquiring and managing the managed user information using the set user authority; and
transmitting a print job generated based on the acquired user information and the stored print setting to an image processing apparatus; and
notifying a filter of the printer driver activated to generate the print job of information for accessing the managed user information.

12. The non-transitory storage medium according to claim 11, wherein the computer executable instructions further comprise returning the authority of the controlling from the user authority to a system authority after the user information is acquired.

13. The non-transitory storage medium according to claim 11, wherein the computer executable instructions further comprise deleting the user information of the user authority after the managed user information is acquired.

14. The non-transitory storage medium according to claim 11, wherein the user information and print setting data are set via a screen of a device application installed in conjunction with the printer driver, and
wherein the printer driver is notified of the print setting data.

15. The non-transitory storage medium according to claim 11, wherein the user information is a password used for secure printing or a telephone number used in FAX transmission.

* * * * *